United States Patent
Dahlhaug

(10) Patent No.: US 8,398,360 B2
(45) Date of Patent: Mar. 19, 2013

(54) METHOD AND DEVICE FOR RESISTING WEAR FROM PARTICLE CONTAINING WATER ON AN IMPELLER

(75) Inventor: Ole Gunnar Dahlhaug, Trondheim (NO)

(73) Assignee: Dynavec AS (NO)

( * ) Notice: Subject to any disclaimer, the term of this patent is extended or adjusted under 35 U.S.C. 154(b) by 0 days.

(21) Appl. No.: 13/384,151

(22) PCT Filed: Jul. 12, 2010

(86) PCT No.: PCT/NO2010/000282
§ 371 (c)(1),
(2), (4) Date: Feb. 1, 2012

(87) PCT Pub. No.: WO2011/008107
PCT Pub. Date: Jan. 20, 2011

(65) Prior Publication Data
US 2012/0121387 A1    May 17, 2012

(30) Foreign Application Priority Data
Jul. 15, 2009    (NO) ................................. 20092682

(51) Int. Cl.
*F04D 27/00*    (2006.01)
(52) U.S. Cl. ............. 415/1; 415/111; 415/116; 415/201
(58) Field of Classification Search .................. 417/431, 417/160; 415/201, 202, 116, 118, 1, 110, 415/111, 112, 121.2; 416/61
See application file for complete search history.

(56) References Cited

U.S. PATENT DOCUMENTS

| 1,942,995 A | * | 1/1934 | Biggs | ............................. 415/115 |
| 2,054,142 A | | 9/1936 | Sharp | |
| 3,398,696 A | * | 8/1968 | Sproule | .......................... 415/109 |
| 4,468,167 A | * | 8/1984 | Ogiwara et al. | .................... 415/1 |
| 5,823,740 A | * | 10/1998 | Cybularz et al. | ............. 415/115 |
| 5,924,844 A | * | 7/1999 | Cybularz et al. | ............. 415/115 |
| 5,944,483 A | * | 8/1999 | Beck et al. | .................... 415/117 |
| 2004/0062635 A1 | * | 4/2004 | Serio | ............................. 415/106 |

FOREIGN PATENT DOCUMENTS

| FR | 1182583 A | 6/1959 |
| NO | 328395 B1 | 9/2009 |

OTHER PUBLICATIONS

Written Opinion issued in connection with PCT/NO2010/000282.

* cited by examiner

*Primary Examiner* — Edward Look
*Assistant Examiner* — William Grigos
(74) *Attorney, Agent, or Firm* — Akerman Senterfitt

(57) ABSTRACT

A method and a device for counteracting wear from particle bearing drive water in a runner (4) in a water turbine (1), the runner (4) comprising a runner hub (16) and a vane (18), or a runner hub (16), a vane (18) and a runner band (20), the vane (18) being attached to the runner hub (16) in a first attachment area (22) and to the runner band (20) in a second attachment area (24), and where the method comprises: —routing a supply channel (40) for water cleaner than the drive water to at least the first attachment area (22) or the second attachment area (24) and—leading water cleaner than the drive water to flow over at least a portion of the vane (18) surface.

8 Claims, 3 Drawing Sheets

Figure 1:
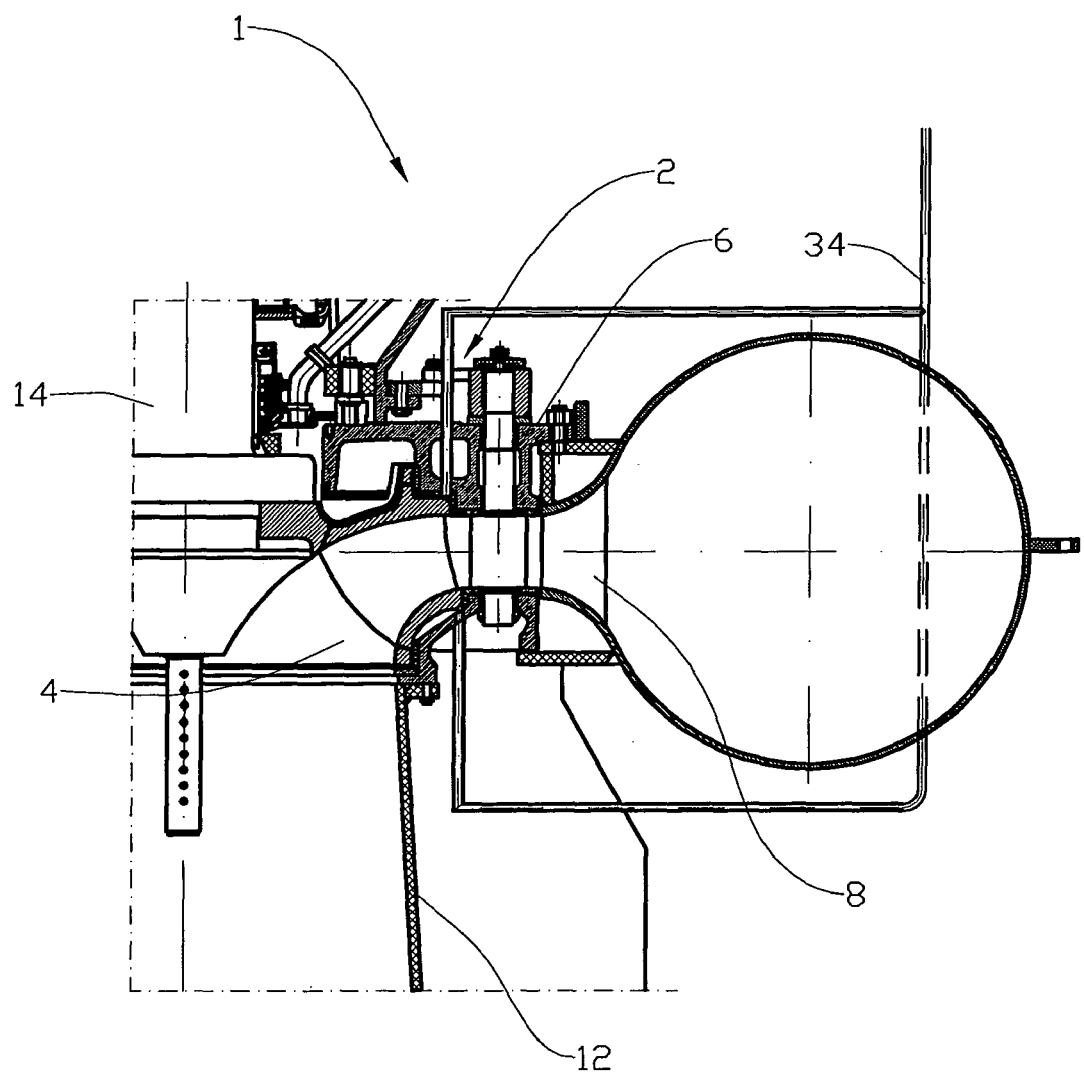

METHOD AND DEVICE FOR RESISTING WEAR FROM PARTICLE CONTAINING WATER ON AN IMPELLER

This application is a national phase of PCT/NO2010/000282, filed Jul. 12, 2010, and claims priority to NO 2009 2682, filed Jul. 15, 2009, the entire contents of both of which are hereby incorporated by reference.

This invention relates to a method for counteracting wear from particle bearing water in a runner. More particularly it concerns a method for counteracting wear from particle bearing water in a runner in a water turbine, the runner comprising a runner hub and a vane, or a runner hub, a vane and a runner band, the vane being attached to the runner hub in a first attachment area and to the runner band in a second attachment area. The invention also comprises a device for performing the method.

By drive water is, in this context, meant water flowing through the turbine for, by pressure drop, handing over energy in the turbine.

Water turbines are exposed to wear from water flowing through the turbine. Turbines being fed river water are typically worn considerably more than turbines being fed water from a reservoir. The reason is that river water may contain considerable amounts of sand.

Even if wear problems more or less relates to all types of turbines, Francis turbines are particularly exposed. Francis turbines are often designed with fairly fine slits in seals between rotary and stationary components.

It has also turned out that considerable wear may occur at the attachment points between fixedly interconnected components. Even a relatively small wear in flow paths or seals will entail a considerable increase in turbulence and water leaks with appurtenant reduction in efficiency.

The object of the invention is to remedy or reduce at least one of the disadvantages of the prior art.

The object is achieved in accordance with the invention by virtue of the features disclosed in the following description and in the subsequent claims.

There is provided a method for counteracting wear from particle bearing drive water in a runner in a water turbine, the runner comprising a runner hub and a vane, or a runner hub, a vane and a runner band, the vane being attached to the runner hub in a first attachment area and to the runner band in a second attachment area, and where the method is characterised in that it comprises:
routing a supply channel for water cleaner than the drive water to at least the first attachment area or the second attachment area; and
leading water cleaner than the drive water to flow over at least a portion of the vane surface.

Cleaner water may advantageously also be led to flow over a portion of the runner hub surface, more particularly that part which is exposed to particle bearing water. The same also relates to the runner band when present.

The method may be performed by means of a device to counteract wear from particle bearing drive water in a runner in a water turbine, the runner comprising a runner hub and a vane, or a runner hub, a vane and a runner band, the vane being attached to the runner hub in a first attachment area and to the runner band in a second attachment area, characterised in that a supply channel for water cleaner than the drive water is routed to at least the first attachment area or the second attachment area.

The supply channel may run through at least an upper cover or a lower cover.

Generally a runner comprises multiple vanes.

The supply channel may run through a first slit encircling the runner hub. Thereby the flow of cleaner water is distributed, besides to the vanes, over a relatively large portion of the internal surface of the runner hub.

The supply channel may run through a second slit encircling the runner band. In a way corresponding to the one described above, cleaner water is thereby distributed over a relatively large portion of the internal surface of the runner band.

The supply channel may run through a first opening in the runner band. Correspondingly it may run through a second opening in the runner band. These first and second channels are arranged to end at in the least the first attachment or the second attachment in a position along the vane.

The first and second slit may be designed with adaptations to lead the cleaner water to areas where a changed flow rate is desirable. The cross-section of the slits may for example be different along the circumference of the slits.

It is obvious to a person skilled in the art that combinations of more supply channels may be arranged to lead cleaner water to several positions in the runner.

The method and device according to the invention makes it possible to protect vital parts in a Francis turbine from impure drive water and prolong the useful life of the components to a considerable degree.

Figure 2:
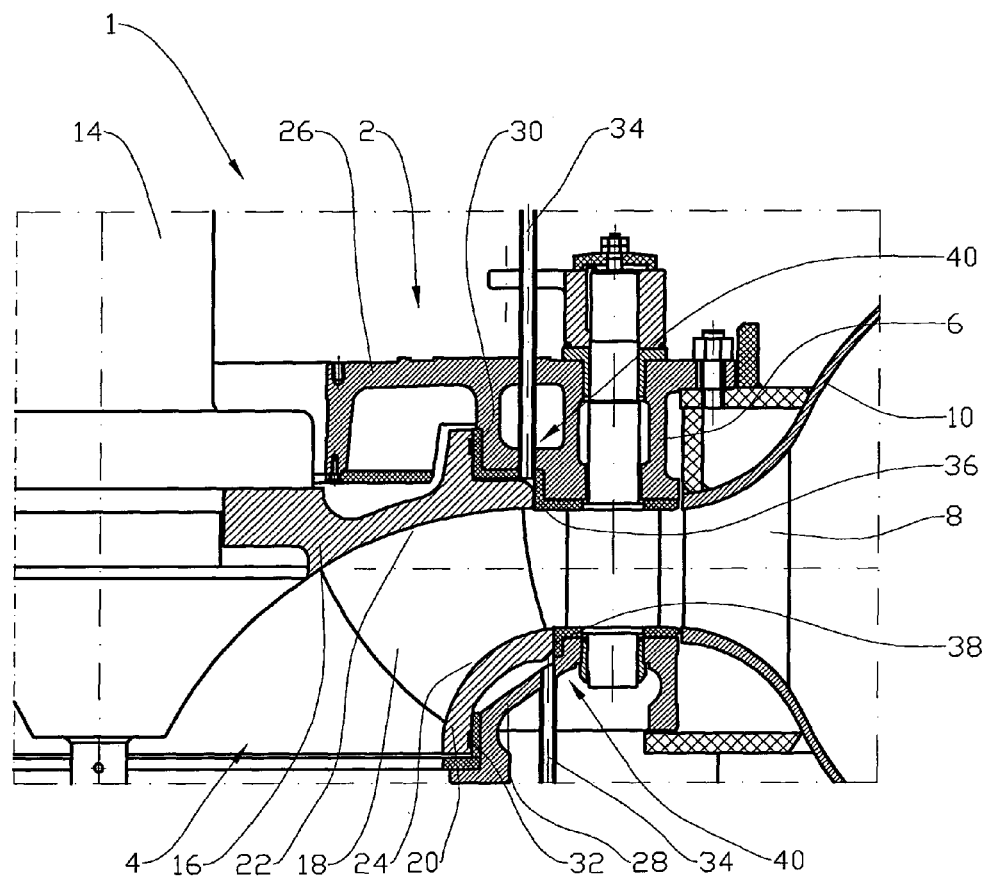
Figure 3:
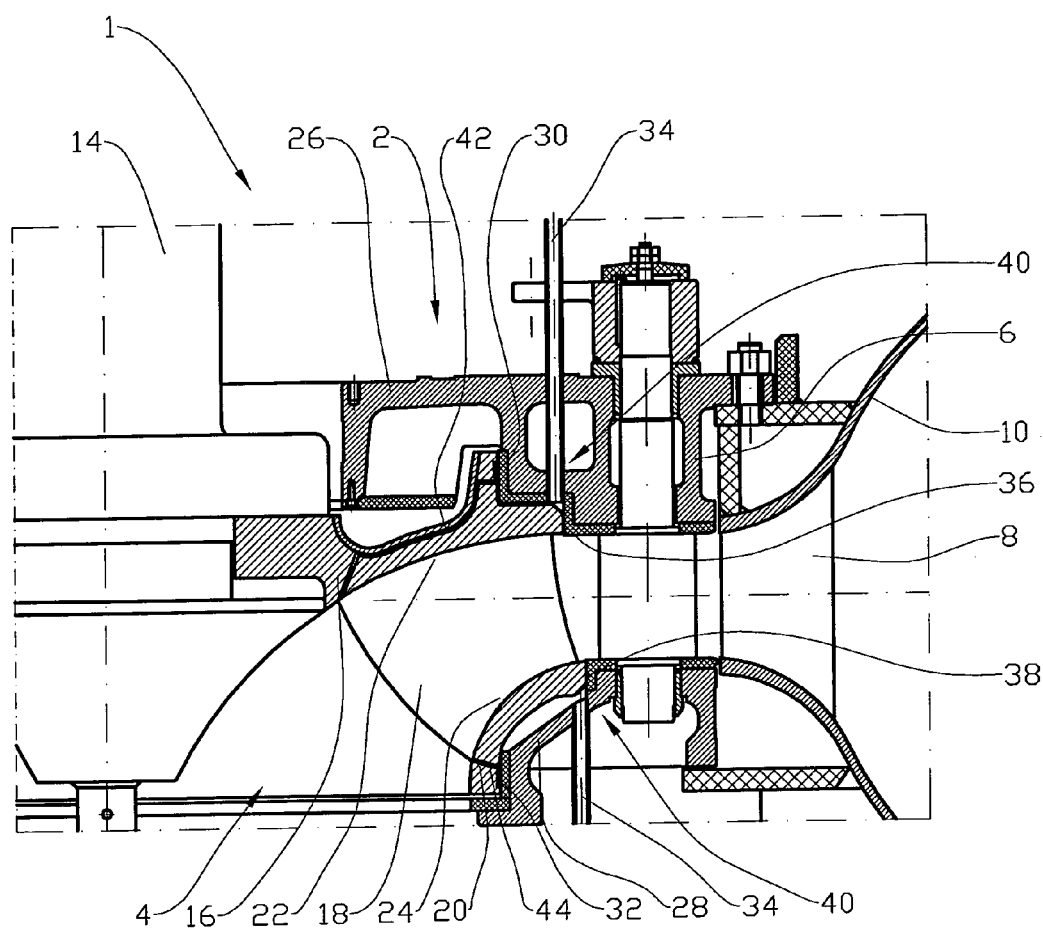

In the following is described an example of a preferred method and embodiment that is illustrated in the accompanying drawings, wherein:

FIG. 1 shows a section of a water turbine provided with a supply channel of the invention; and FIG. 2 shows an extract from FIG. 1 to a larger scale; and FIG. 3 shows the same as FIG. 2, but in an alternative embodiment.

In the drawings the reference numeral 1 indicates a water turbine of a per se known embodiment comprising a turbine housing 2 and a runner 4.

The turbine housing 2 is composed of a guide apparatus 6 encircling the runner 4, a stay ring 8 and a spiral drum 10 encircling the guide apparatus 6. The outlet from the turbine housing 2 is connected to a suction pipe 12.

The runner 4 connected to a runner shaft 14, comprises a runner hub 16, a plurality of vanes 18 and a runner band 20, see FIG. 2. The transition between the vanes 18 and the runner hub 16 constitutes a first attachment area 22, while the transition between the vanes 18 and the runner band 20 constitutes a second attachment area 24.

The turbine housing 2 comprises an upper cover 26 and a lower cover 28, as an upper labyrinth seal 30 is arranged between the runner hub 16 and the upper cover 26, while a lower labyrinth seal 32 is arranged between the runner band 20 and the lower cover 28.

The terms upper and lower refer to the turbine 1 in the normal operation position.

A supply pipe 34 for cleaner water runs through the upper cover 26 and the lower cover 28 to the runner hub 16 outside and the runner band 20 outside, respectively.

A ring shaped first slit 36 is formed between the runner hub 16 and the upper cover 26, while a ring shaped second slit 38 is formed between the runner band 20 and the cover 28.

In this preferred embodiment example the supply pipe 34, the first slit 36, the second slit 38 and any annulus between the runner 4 and the turbine housing 2 constitute a supply channel for 40 for cleaner water to the runner 4.

During operation cleaner water flows via the supply pipe 34 and the slits 36, 38 in to the runner 4 where it is distributed on the surface of the vanes 18, the runner hub 16 and the runner band 20. The particle bearing drive water is thereby, at least partly on a portion of the runner 4, prevented from getting in contact with the material in the runner 4.

In an alternative embodiment, see FIG. 3, there is arranged a first opening 42 in the runner hub 16 to be able to lead cleaner water to for example areas along the first attachment area 22.

Correspondingly a second opening 44 is arranged in the runner band 20 to be able to lead cleaner water to for example areas along the second attachment area 24.

In this alternative embodiment the supply pipe 34 and the openings 42 and 44 constitute a part of the supply channel 40.

The cleaner water may for example be cleaned water from the same source as the drive water, or water from a cleaner source.

The invention claimed is:

1. A method for counteracting wear from particle bearing drive water in a runner in a water turbine, the runner comprising a runner hub and a vane, or a runner hub, a vane and a runner band, vane being attached to the runner hub in a first attachment area and to the runner band in a second attachment area, wherein the method comprises:
routing a supply channel for water cleaner than the drive water to at least the first attachment area or the second attachment area; and
leading water cleaner than the drive water to flow over at least a portion of the vane surface.

2. A device for counteracting wear from particle bearing drive water in a runner in a water turbine, the runner comprising a runner hub and a vane, or a runner hub, a vane and a runner band, the vane being attached to the runner hub in a first attachment area, or where the vane is attached to the runner hub in a first attachment area and to the runner band in a second attachment area, wherein a supply channel for water cleaner than the drive water is routed to at least the first attachment area or to the second attachment area.

3. The device according to claim 2, wherein the supply channel runs through an upper cover.

4. The device according to claim 2, wherein the supply channel runs through a lower cover.

5. The device according to claim 2, wherein the supply channel runs through a first slit encircling the runner hub.

6. The device according to claim 2, wherein the supply channel runs through a second slit encircling the runner band.

7. The device according to claim 2, wherein the supply channel runs through a first opening in the runner hub.

8. The device according to claim 2, wherein the supply channel runs through a second opening in the runner band.

* * * * *